United States Patent [19]

Kondakov

[11] Patent Number: 5,500,394

[45] Date of Patent: Mar. 19, 1996

[54] FIRE-RESISTANT AND THERMAL SHOCK-RESISTANT COMPOSITE CERAMIC MATERIAL AND METHOD OF MAKING SAME

[75] Inventor: Stanislav F. Kondakov, Chernagolovka, Russian Federation

[73] Assignee: Composite Materials, Inc., Fairfax, Va.

[21] Appl. No.: 362,349

[22] Filed: Dec. 22, 1994

[51] Int. Cl.$^6$ ............................ C04B 35/56; C04B 35/58
[52] U.S. Cl. ........................ 501/89; 501/91; 501/92; 501/93; 428/698; 428/699; 428/704; 428/921; 252/516
[58] Field of Search ................... 501/89, 90, 91, 501/92, 93; 428/920, 921, 697, 698, 699, 700, 701, 702, 704; 252/506, 507, 516, 520

[56] References Cited

U.S. PATENT DOCUMENTS 5,082,597  1/1992  Tashiro et al. ............................ 501/93

FOREIGN PATENT DOCUMENTS 2140823  12/1984  United Kingdom ..................... 501/90

*Primary Examiner*—Paul Marcantoni
*Attorney, Agent, or Firm*—Morgan & Finnegan

[57] ABSTRACT

The invention provides a ceramic composite material which includes 60–85% silicon carbide, 4–15% titanium carbide, 4–20% titanium boride, 4–13% aluminum oxide, and 1–8% titanium oxide. All constituents are in powder form, and have a particle size of between 1 and 40 microns, and a purity of at least 97%. The powdered constituents are blended and consolidated by sintering, although either hot isostatic pressing (HIPing) or by hot pressing can be used to improve certain properties such as impact resistance.

5 Claims, No Drawings

FIRE-RESISTANT AND THERMAL SHOCK-RESISTANT COMPOSITE CERAMIC MATERIAL AND METHOD OF MAKING SAME

FIELD OF THE INVENTION

The invention pertains to inorganic materials and can be used in different types of fire-resistant products and applications and in metallurgy. For example, the present invention can be used for fire-proof safes and other similar products as it can resist temperatures higher than 2000° C. in corrosive oxygen-rich environments, and has excellent insulation properties. By using production methods such as hot press and hot isostatic press (HIP), the material of the present invention has high fracture toughness and can be used in anti-ballistic applications as well.

BACKGROUND OF THE INVENTION

There is a significant demand for ceramic materials made from carbide compounds, because these materials have a very high melting/decomposition temperature and have several advantages over ceramic oxides. They are less brittle than the oxide-based ceramics and are harder materials than the oxides.

Silicon carbide is one of the least expensive and widely used carbides which can be used in fire and oxidation resistant applications if certain disadvantages of this material could be avoided. By itself, silicon carbide has disadvantages in fire-resistant and high temperature applications, in that it is quite brittle, has low thermal-shock resistance, and also exhibits low high-temperature strength and low heat-resistance especially in oxygen-rich environments at high temperatures (over 1600° C.).

Russian author-certificate No. 666152 MKI C04B 35/36, 1977, describes a ceramic composite material containing silicon carbide, aluminum oxide, and aluminum-chromium-phosphate binder. However, this material has relatively low fire-resistance, very low high-temperature strength, and very low impact-resistance.

Thus, a continuing need exists for an improved ceramic composite material capable of achieving improved physical properties and performance characteristics for fire-resistance, heat-resistance, thermal shock-resistance, and impact-resistance.

SUMMARY OF THE INVENTION

The present invention provides a ceramic composite material using silicon carbide as a base, that has significantly better physical properties and performance characteristics than silicon carbide and known silicon carbide based composites, and does not have the high-temperature disadvantages of these materials.

An object of the present invention is to provide a ceramic composite material having myriad uses and diverse applications.

Another object of the present invention is to provide a ceramic composite material that maintains good high temperature strength and impact resistance, while exhibiting excellent fire-resistance, heat resistance and thermal shock resistance.

Still another object of the present invention is to provide a ceramic composite material which is composed of relatively inexpensive non-metallic constituents, and is capable of being manufactured relatively inexpensively.

Another object of the present invention is to provide a ceramic composite material in which its physical properties can be tailored for different end uses by adjusting one or more of the following aspects of its composition and/or production method: (a) variations in material granularity and quality; (b) variations in selection of production method; (c) variations in composite ratios; (d) relatively minor additions of new constituents; (e) variations in specific process steps in each production process; and (f) introduction of certain fibers to reinforce the invented material.

These and other objects of the invention are met by providing a ceramic composite material which includes 60–85% silicon carbide, 4–15% titanium carbide, 4–20% titanium boride, 4–13% aluminum oxide, and 1–8% titanium oxide. All constituents are in powder form, and have a particle size of between 1 and 40 microns, and a purity of at least 97%. The powdered constituents are blended and consolidated by sintering, although blanks with different properties such as higher impact-resistance can be produced by either hot isostatic pressing (HIPing) or by hot pressing.

Properties are optimized with the constituent materials provided in the mass ratios of 70–80% silicon carbide, 5–10% titanium carbide, 6–10% titanium boride, 5–10% aluminum oxide, and 2–5% titanium oxide.

Other objects, advantages and salient features of the invention will become apparent from the following detailed description, which discloses preferred but non-limiting embodiments of the invention.

DETAILED DESCRIPTION OF THE PREFERRED EMBODIMENT

The present invention includes a ceramic composite material which contains silicon carbide, titanium carbide, titanium boride, aluminum oxide, and titanium oxide, all of which are, prior to consolidation, in powder form and of powder particle size between 1 and 40 microns, with the range of 3 to 10 microns being preferred, and purity of 97 percent and higher.

The cost-quality optimal is at or about 98 percent.

The preferred mass ratios are as follows:

| Optimal properties range | | General Range |
| --- | --- | --- |
| Silicon carbide: | 70–80% | 60–85% |
| Titanium carbide: | 5–10% | 4–15% |
| Titanium boride: | 6–10% | 4–20% |
| Aluminum oxide: | 5–10% | 4–13% |
| Titanium oxide: | 2–5% | 1–8% |

The general range is used as a trade-off where certain properties and qualities can be traded for cost and simplification of production, whereas the optimal properties range provides the best overall physical properties.

While ranges outside the optimal ranges provide acceptable trade-offs, ranges outside the general ranges are considered to have unacceptable results.

The ceramic composite material of the present invention is produced by sintering, hot press or by HIP. Sintering is the least expensive and simplest but results in lower impact-resistance. Hot-press and HIPing are preferred for achieving better impact-resistance properties.

Methodology

The ceramic material of the present invention is produced pursuant to the following steps. First, the powders of the above mentioned components with the particle size of, preferably, 3–10 micrometers are mixed in the desired proportions in a vibration ball mill to obtain homogeneous distribution of components in the resultant composite mixture and a uniform distribution of particle sizes. Mixing time depends on the specific ratios, particle sizes, and mixing techniques. In one example, using the ball mill, mixing took 4–5 hours. The blended composite mixture thus obtained is pressed into raw product form that is finally processed by sintering or hot press or high temperature isostatic pressure (HIP). To obtain products of adequate quality it is necessary to strictly follow the production procedure, since this material is very sensitive to variations of temperature and pressure, and pressure and duration of the exposure to heat and pressure after achieving the initial densification.

Example I 100 gm of silicon carbide powder (73% mass) with the average particle diameter 3–10 mkm, 10 gm of titanium carbide powder (7.3% mass) with the average particle diameter of 3–7 mkm, 12 gm of titanium boride powder (8.8% mass) with the average particle diameter of 7–15 mkm, 10 gm of aluminum oxide powder (7.3% mass) with the average particle diameter of 7–10 mkm, and 5 gm (3.6% mass) of titanium oxide with the average particle diameter of 5–10 mkm are blended as stated above. The resultant blend is then pressed into raw product forms which are then sintered at high temperature of about 1,900° C. for about one hour.

Test Results

Samples made according to Example I were tested for fire resistance, heat resistance, thermal-shock resistance, bending strength, and compression strength.

Samples 4×4×27 mm were mounted in a device for 4-point bending tests at room temperature and stress was applied until the sample snapped. The load at breaking point was measured and the maximum resistance to bending was calculated.

Samples 4×4×12 mm were subjected to compression at room temperature by applying stress until the sample broke. The load at breaking point was measured and the maximum resistance to compression was calculated.

The heat resistance of similar samples was measured. The change in the mass of the sample was measured after oxidation in air at 1,200° C. during 10 hours.

Thermal-shock resistance of the samples was measured using cylindrical samples 10 mm in diameter and 10 mm high. The number of thermal shocks (1,200° C. to water at 10° C.) necessary to destroy the sample was determined.

The fire resistance of the samples was tested using samples 50 mm in diameter and 5–8 mm thick. The samples were placed 30–40 mm away from the nozzle of a propane-oxygen burner having a flame temperature of about 2000° C. The samples were held under the flame for 30–60 minutes, after which they were allowed to cool and were inspected for damage.

All tests were conducted using several samples for each test. The following properties of the present material were observed:

| | |
|---|---|
| Density (g/cm$^3$) | 2.4–3.52 |
| Porosity (%) | 32–0 (test samples: 28%) |
| Bending Strength (MPa) | 82–85 (porosity 28%) |
| Compression Strength (MPa) | 323–330 (porosity 28%) |
| Thermal Shock | 30–35 cycles |
| Heat Resistance (mg/cm$^2$) | <0.5 |
| Fire Resistance (at 2000° C.) | >60 minutes |

The heat resistance measure is the change in mass due to oxidation in air at 1,200° C. after 10 hour exposure.

The fire resistance measure is the time the material has been tested to successfully withstand a propane-oxygen flame at 2,000° C.

One aspect of the present invention is that the material properties can be traded off for other advantages. For example, the optimum amount of silicon carbide is in the range of 70 to 80 percent. If the percentage ratio of silicon carbide is less than 70 percent, the fire-resistance capability is degraded. On the other hand, increasing the amount of silicon carbide more than 80 percent results in significant degradation of impact resistance and heat-strength.

The optimum amount of titanium carbide is in the range of 5 to 10 percent. Reducing titanium carbide to less than 5 percent degrades the heat strength, thermal-shock resistance, and impact resistance properties of the material. Increasing titanium carbide to more than 10 percent will degrade the fire resistance and heat resistance of the material.

The introduction of 6 to 10 percent of titanium boride in the composite mixture improves the fire resistance, heat resistance, and impact resistance of the material.

The introduction of 5 to 10 percent of aluminum oxide in the composite mixture makes it possible to process the material at lower temperatures without negatively affecting the properties of the material.

The introduction of 2 to 5 percent of titanium oxide in the composite mixture significantly improves the thermal-shock resistance and impact resistance of the material.

Sintering, as opposed to HIPing or hot pressing, can be used where certain uses are envisioned where high strength and impact resistance are not as critical.

While advantageous embodiments have been chosen to illustrate the subject invention, it will be understood by those skilled in the art that various changes and modifications can be made therein without departing from the scope of the invention as defined by the appended claims.

What is claimed is:

1. A sintered ceramic composite material consisting essentially of:

A consolidated blend of constituent powders of silicon carbide, titanium carbide, titanium boride, aluminum oxide and titanium oxide, wherein the constituent powders are present in the amounts of 70–80 wt. % silicon carbide, 5–10 wt. % titanium carbide, 6–10 wt. % titanium boride, 5–10 wt. % aluminum oxide, and 2–5 wt. % titanium oxide.

2. A sintered ceramic composite material according to claim 1, wherein the blended constituent powders are consolidated in a hot press held at a high working temperature and pressure for a time sufficient to substantially complete densification, said blended constituent powders being maintained at high heat and pressure in the hot press for a time effective to achieve a sufficient theoretical density.

3. A sintered ceramic composite material according to claim 1, wherein the powder constituents have a particle size between 1 and 40 microns.

4. A sintered ceramic composite material according to claim 1, wherein the powder constituents have a particle size between 3 and 10 microns.

5. A sintered ceramic composite material according to claim 1, wherein the constituent powders are present in the amounts of about 73 wt. % silicon carbide, 7.3 wt. % titanium carbide, 8.8 wt. % titanium boride, 7.3 wt. % aluminum oxide, and 3.6 wt. % titanium oxide.

\* \* \* \* \*